US010335740B2

(12) United States Patent
Moon et al.

(10) Patent No.: US 10,335,740 B2
(45) Date of Patent: Jul. 2, 2019

(54) SUBMERGED-TYPE FILTRATION APPARATUS

(71) Applicant: KOLON INDUSTRIES, INC., Gwacheon-si, Gyeonggi-do (KR)

(72) Inventors: Heewan Moon, Yongin-si (KR); Jung Min Noh, Yongin-si (KR)

(73) Assignee: KOLON INDUSTRIES, INC., Seoul (KR)

( * ) Notice: Subject to any disclaimer, the term of this patent is extended or adjusted under 35 U.S.C. 154(b) by 246 days.

(21) Appl. No.: 15/103,461

(22) PCT Filed: Dec. 11, 2014

(86) PCT No.: PCT/KR2014/012181
§ 371 (c)(1),
(2) Date: Jun. 10, 2016

(87) PCT Pub. No.: WO2015/088259
PCT Pub. Date: Jun. 18, 2015

(65) Prior Publication Data
US 2016/0375408 A1    Dec. 29, 2016

(30) Foreign Application Priority Data

Dec. 11, 2013 (KR) .................. 10-2013-0153958
Dec. 11, 2013 (KR) .................. 10-2013-0153963
Dec. 11, 2013 (KR) .................. 10-2013-0153966

(51) Int. Cl.
*B01D 63/02* (2006.01)
*B01D 65/02* (2006.01)
*C02F 3/06* (2006.01)

(52) U.S. Cl.
CPC ............. *B01D 65/02* (2013.01); *B01D 63/02* (2013.01); *B01D 63/026* (2013.01);
(Continued)

(58) Field of Classification Search
CPC ............ B01D 2313/12; B01D 2313/20; B01D 2315/06; B01D 2321/04; B01D 2321/185;
(Continued)

(56) References Cited

U.S. PATENT DOCUMENTS 5,285,903 A * 2/1994 Sorenson ............... B27N 1/003
                                                            209/17
2002/0139748 A1* 10/2002 Cote ..................... B01D 61/18
                                                            210/636

(Continued)

FOREIGN PATENT DOCUMENTS

KR    10-2002-0070181 A      9/2002
KR    10-2008-0105789    * 12/2004

(Continued)

OTHER PUBLICATIONS

English language machine translation of KR20090121833, 7 pages, No Date.*

(Continued)

*Primary Examiner* — Pranav N Patel
(74) *Attorney, Agent, or Firm* — Sughrue Mion, PLLC

(57) ABSTRACT

Disclosed is a submerged-type compact filtration apparatus of minimized footprint which can be installed easily, maintained safely and conveniently, and operated with substantially reduced energy. The submerged-type filtration apparatus of the invention comprises a filtration bath disposed over a ground; a filtration membrane cassette configured to be installed in the filtration bath; and a first guide disposed in the filtration bath and configured to guide the filtration membrane cassette when the filtration membrane cassette is inserted into the filtration bath so as to be installed therein.

18 Claims, 8 Drawing Sheets

(52) U.S. Cl.
CPC ...... *B01D 2313/18* (2013.01); *B01D 2313/20* (2013.01); *B01D 2315/06* (2013.01); *B01D 2321/04* (2013.01); *B01D 2321/185* (2013.01)

(58) Field of Classification Search
CPC ...... B01D 63/02; B01D 63/026; B01D 65/02; C02F 1/44; C02F 1/441; C02F 1/444; C02F 3/1273
See application file for complete search history.

(56) References Cited

U.S. PATENT DOCUMENTS

| | | | | |
|---|---|---|---|---|
| 2004/0188339 | A1* | 9/2004 | Murkute | B01D 61/18 210/321.8 |
| 2006/0213833 | A1* | 9/2006 | Kando | B01D 65/02 210/626 |
| 2007/0289362 | A1* | 12/2007 | Ross | B01D 61/145 73/38 |
| 2009/0236295 | A1* | 9/2009 | Braun | B01D 61/18 210/767 |
| 2010/0000935 | A1* | 1/2010 | Sakai | B01D 63/082 210/455 |
| 2010/0126929 | A1* | 5/2010 | Husain | B01D 63/043 210/610 |
| 2010/0292844 | A1* | 11/2010 | Wolf | C02F 9/00 700/271 |
| 2011/0049037 | A1 | 3/2011 | Masutani et al. | |
| 2012/0285895 | A1* | 11/2012 | Smiddy | C02F 1/56 210/724 |
| 2012/0292318 | A1* | 11/2012 | Kennedy | B01D 61/18 220/200 |
| 2014/0027360 | A1* | 1/2014 | Lee | B01D 63/04 210/99 |

FOREIGN PATENT DOCUMENTS

| | | |
|---|---|---|
| KR | 10-0885513 B1 | 2/2009 |
| KR | 10-2009-0121833 * | 11/2009 |
| KR | 10-0932739 * | 12/2009 |
| KR | 10-1169027 B1 | 7/2012 |
| KR | 10-1321670 B1 | 10/2013 |
| WO | WO2012125003 * | 9/2012 |

OTHER PUBLICATIONS

English language machine translation of KR20080105789, 6 pages, No date.*
English language machine translation of KR10-0932739, 7 pages, No date.*
International Searching Authority, International Search Report for PCT/KR2014/012181 dated Mar. 30, 2015.

* cited by examiner

SUBMERGED-TYPE FILTRATION APPARATUS

CROSS REFERENCE TO RELATED APPLICATIONS

This application is a National Stage of International Application No. PCT/KR2014/012181 filed Dec. 11, 2014, claiming priority based on Korean Patent Application Nos. 10-2013-0153958, 10-2013-0153963 and 10-2013-0153966, all filed Dec. 11, 2013, the contents of all of which are incorporated herein by reference in their entirety.

TECHNICAL FIELD

The present invention relates to a submerged-type filtration apparatus, and more particularly, to a submerged-type filtration apparatus of relatively small footprint which can be installed easily, maintained safely and conveniently, and operated with substantially reduced energy.

BACKGROUND ART

Separation methods for water treatment include a method using a filtering membrane, a method using heat or phase-change, and so on.

A separation method using a filtering membrane has a lot of advantages over the method using heat or phase-change. Among the advantages is the high reliability of water treatment since the water of desired purity can be easily and stably obtained by adjusting the size of the pores of the filtering membrane. Furthermore, since the separation method using a filtering membrane does not require a heating process, the method can be used together with microorganisms which are useful for separation process but might be adversely affected by heat.

Typically, a filtering membrane has been widely used in the field of microfiltration for obtaining axenic water, drinking water, super pure water, and so on. Recently, the application of a filtering membrane is being extended to wastewater treatment, solid-liquid separation in a septic tank, removal of suspended solid (SS) from industrial wastewater, filtration of river, filtration of industrial water, filtration of swimming pool water, and the like.

A separation method using a filtering membrane may be classified into a submerged-type filtration and a pressurized-type filtration.

In the pressurized-type filtration, a bundle of hollow fiber membranes are disposed inside a module case. Feed water is introduced into the module case under a predetermined pressure or more so that only the fluid exclusive of impurities can selectively penetrate the hollow fiber membranes.

In the submerged-type filtration, a filtration bath disposed under the surface of ground is filled with feed water, and a filtering membrane of a flat sheet or hollow fiber shape is submerged in the feed water. Negative pressure is applied to the filtering membrane submerged in the feed water so as to incur transmembrane pressure. Due to the transmembrane pressure, only the fluid exclusive of impurities is allowed to penetrate the filtering membrane.

The pressurized-type filtration is more vulnerable to membrane contamination than the submerged-type filtration since it requires a bundle of hollow fiber membranes to exist with high packing density in a module case. Thus, water including relatively high density of impurities is generally treated by means of the submerged-type filtration. In the submerged-type filtration, a unit to be made and installed is a cassette comprising a frame structure, a plurality of submerged-type filtering membrane modules, an aeration unit, and so on.

However, the submerged-type filtration is inconvenient compared to the pressurized-type filtration which only requires the hollow fiber membrane module to be connected to pipes, in that it is required to form the filtration bath under the surface of ground, arrange the filtering membrane modules appropriately in the filtration bath depending on the shape and size of the filtration bath, and, after submerging the filtering membrane modules in the feed water, connect them directly to the various other components such as a pump, a blower, an so on.

Furthermore, the submerged-type filtration is inconvenient and risky as well since it requires a person to go down to the filtration bath disposed under the surface of ground to maintain the filtration apparatus and periodically remove the sludge accumulated in the filtration bath during the filtration process.

To obviate such problem, it may be considered to use a filtration bath which can be disposed over the ground instead of the filtration bath to be disposed under the surface of ground. However, such filtration bath cannot but be arranged in parallel with various components and pipes including a pipe to supply the feed water to the filtration bath, a pipe to convey the filtrate produced by the filtering membrane modules submerged in the feed water of the filtration bath, a pump for providing a negative pressure to the filtering membrane module, a blower for providing air to the aeration unit, etc., thereby making the structure of the filtration apparatus more complicated and increasing the footprint of the filtration apparatus.

As the water treatment by means of the filtering membrane module is performed, contamination of the filtering membrane with impurities is caused, which significantly decreases the water permeation performance of the filtering membrane. Since various kinds of the impurities causes the contamination of the filtering membrane in various way, the filtering membrane is needed to be cleaned through various methods, e.g., aeration cleaning and backwashing.

According to the aeration cleaning method, the air from an aeration tube under the membranes rises toward the membranes so that the air bubbles, by themselves, can remove the contaminants attached to the surfaces of the filtering membranes and cause the water inside the filtration bath to rise or circulate thereby removing the contaminants from the surfaces of the filtering membranes. The aeration tube ejecting the air for the aeration cleaning often loses its horizontal status due to its reaction against the air ejection. When the aeration tube loses its horizontal status, the air ejected from the aeration tube is driven to a certain side and, as s result, the whole filtering membranes cannot be cleaned uniformly.

According to the backwashing method, a portion of the filtrate produced by the filtering membrane module is supplied to a backwash water bath though a certain pathway, stays there, flows along the pathway in reverse direction by virtue of a backwash pump, and then passes through the filtering membrane thereby separating the contaminants attached to the surface from the filtering membrane. The filtration pump is paused during the backwashing process. On the contrary, the backwash pump is paused during the filtration process. Since the filtration pump and backwash pump are separately provided and separately operated, they make the structure of the filtration apparatus complicated. Furthermore, the repetitive operation and stop incur the excessive energy consumption.

Additionally, since, when the conventional submerged-type filtration apparatus is installed, it is required to convey the various components to the place of water treatment separately and put them together there, the work for installation is cumbersome. For this reason, the submerged-type filtration apparatus is rarely installed in a place where only water treatment of small scale is needed.

DISCLOSURE

Technical Problem

Therefore, the present invention is directed to a submerged-type filtration apparatus capable of preventing these limitations and drawbacks of the related art.

An aspect of the present invention is to provide a submerged-type filtration apparatus of relatively small footprint which can be maintained conveniently and easily and operated with substantially reduced energy.

The another aspect of the present invention is to provide a submerged-type filtration apparatus of relatively small footprint which can be installed easily, maintained safely and conveniently, and operated with substantially reduced energy, and which enables a person to observe the air bubbles ejected from an aeration tube during the filtration process.

The further another aspect of the present invention is to provide a submerged-type filtration apparatus of relatively small footprint which can be installed easily, maintained safely and conveniently, operated with substantially reduced energy, and transported to a certain place of water treatment after being assembled.

Additional aspects and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims.

Technical Solution

In accordance with the aspect of the present invention, there is provided a submerged-type filtration apparatus comprising: a filtration bath disposed on a ground; a filtration membrane cassette configured to be installed in the filtration bath; and a first guide disposed in the filtration bath and configured to guide the filtration membrane cassette when the filtration membrane cassette is inserted into the filtration bath so as to be installed therein.

The first guide may extend in a direction parallel to a direction in which the filtration membrane cassette is inserted into the filtration bath.

The first guide may be an inner feed water pipe for supplying feed water into the filtration bath or an inner air pipe for supplying the filtration membrane cassette with air for aeration cleaning.

The submerged-type filtration apparatus may further comprise a second guide disposed in the filtration bath and configured to guide the filtration membrane cassette when the filtration membrane cassette is inserted into the filtration bath so as to be installed in the filtration bath.

The filtration membrane cassette may comprise a frame structure; a plurality of filtering membrane modules installed in the frame structure; and an aeration unit combined with the frame structure and configured to eject air bubbles toward the filtering membrane modules, and the second guide may be the inner air pipe for supplying air to the aeration unit.

The submerged-type filtration apparatus may further comprise a feed water source configured to supply the feed water to the inner feed water pipe through a feed water inlet formed on a lower part of the filtration bath; and a blower configured to supply air to the inner air pipe through an air inlet formed on the lower part of the filtration bath.

The submerged-type filtration apparatus may further comprise a flexible hose connecting the inner air pipe to the aeration unit.

Filtrate produced by the filtration membrane cassette may be discharged through a filtrate outlet formed on a lower part of the filtration bath.

The submerged-type filtration apparatus may further comprise a backwash water bath configured to receive the filtrate discharged through the filtrate outlet.

The submerged-type filtration apparatus may further comprises a filtrate storage tank; and a float valve configured to allow the filtrate discharged from the filtration bath to pass the backwash water bath and flow into the filtrate storage tank once water level of the filtrate in the backwash water bath reaches a predetermined level.

The submerged-type filtration apparatus may further comprises a pipe for guiding flow of the filtrate from the filtrate outlet to the filtrate storage tank, and the pipe may pass through the backwash water bath.

The submerged-type filtration apparatus may further comprises a pump for providing the filtration membrane cassette or the backwash water bath with negative pressure; a first 3-way valve configured to allow the negative pressure to be supplied only to the filtration membrane cassette during a filtration process and only to the backwash water bath during a backwashing process; and a second 3-way valve configured to allow the filtrate provided from the filtration membrane cassette by virtue of the pump to flow only to the backwash water bath during the filtration process and allow backwash water provided from the backwash water bath by virtue of the pump to flow only to the filtration membrane cassette during the backwashing process.

In accordance with another aspect of the present invention, the filtration bath may include a transparent window.

The transparent window may be openable.

In accordance with further another aspect of the present invention, the submerged-type filtration apparatus may further comprises a container having the filtration bath therein. The filtration bath may have a feed water inlet and a filtrate outlet, the container may have a feed water inlet port and a filtrate outlet port, the feed water to be processed may pass through the feed water inlet port and the feed water inlet sequentially so as to be introduced into the filtration bath, and the filtrate produced by the filtration membrane cassette may pass through the filtrate outlet and the filtrate outlet port sequentially so as to be discharged from the container.

The submerged-type filtration apparatus may further comprise a backwash water bath disposed in the container and configured to receive at least a portion of the filtrate produced by the filtration membrane cassette and discharged from the filtration bath through the filtrate outlet.

The submerged-type filtration apparatus may further comprise a float valve in the backwash water bath, the float valve configured to allow the filtrate discharged from the filtration bath through the filtrate outlet to pass the backwash water bath without stopping and flow only to the filtrate outlet port once water level of the filtrate in the backwash water bath reaches a predetermined level.

The backwash water bath may have a backwash water outlet, the filtration membrane cassette may comprise an aeration unit for cleaning a filtering membrane, the filtration bath may have an air inlet, the submerged-type filtration apparatus may further comprise a first pump for providing the filtration membrane cassette with negative pressure through the filtrate outlet or providing the backwash water bath with negative pressure through the backwash water outlet; a first 3-way valve configured to allow the negative pressure from the first pump to be supplied only to the filtration membrane cassette during a filtration process and only to the backwash water bath during a backwashing process; a second 3-way valve configured to allow the filtrate produced by the filtration membrane cassette to flow only to the backwash water bath during the filtration process and allow the filtrate provided from the backwash water bath to flow only to the filtration membrane cassette during the backwashing process; a blower configured to supply air to the aeration unit through the air inlet; and a control unit configured to control operation of the first pump, the first and second 3-way valves, and the blower, and the first pump, the first and second 3-way valves, the blower, and the control unit may be disposed in the container.

The filtration bath further may have a chemical inlet, the submerged-type filtration apparatus may further comprise, in the container, a chemical storage unit; and a second pump for supplying a chemical material contained in the chemical storage unit to the filtration bath via the chemical inlet, and operation of the second pump may be controlled by the control unit.

The filtration bath may further have an overflow outlet and the container may further have an overflow outlet port, so that an overflow which occurs when water level of the feed water in the filtration bath becomes a predetermined level or more can pass through the overflow outlet and the overflow outlet port sequentially so as to be discharged from the container.

The filtration bath may further have a sludge outlet and the container may further have a sludge outlet port, so that condensed water and sludge which accumulate in the filtration bath as a filtration process is carried out can pass through the sludge outlet and the sludge outlet port sequentially so as to be discharged from the container.

It is to be understood that both the foregoing general description and the following detailed description of the present invention are exemplary and explanatory and are intended to provide further explanation of the invention as claimed.

Advantageous Effect

Although the filtration apparatus of the present invention is submerged-type, it is as advantageous as a pressurized-type filtration apparatus in terms of installation convenience since the only thing required to do for the installation is to connect the filtration bath with the pipes in a manner similar to that of the pressurized-type filtration apparatus and the filtration membrane cassette can be automatically connected to at least one of the pipes when installed inside the filtration bath.

Further, the submerged-type filtration apparatus of the present invention can be maintained more safely and more conveniently since its filtration bath is disposed over the ground. The filtration apparatus of the present invention has excellent drain efficiency since the sludge occurring inside the filtration bath can be naturally discharged by virtue of the gravity. Additionally, the submerged-type filtration apparatus of the present invention is suitable for standardization as well as decoration to increase its marketability.

Furthermore, the footprint of the submerged-type filtration apparatus can be minimized by disposing the various components such as a pump for providing the filtering membrane modules with negative pressure, a blower for providing the aeration unit with air, etc. below the filtration bath. The compact filtration apparatus manufactured as such may be a salable unit of high marketability.

In addition, a substantial amount of energy can be saved by replacing the filtration pump and backwash pump of the related art with a single pump which is operated pauselessly for both filtration and backwash.

Further, the transparent window of the filtration bath disposed over the ground makes it possible to observe the air bubbles ejected from the aeration tube. Accordingly, when the air ejected from the aeration tube is driven to a certain side and, as s result, the whole filtering membranes cannot be cleaned uniformly, this accident can be immediately recognized and fixed. When the filtration membrane cassette is inserted into the filtration bath, it is possible for a person outside the filtration bath to see the connection status between the filtrate discharging pipe of the filtration membrane cassette and the filtrate outlet of the filtration bath. Hence, the filtrate discharging pipe can be easily connected to the filtrate outlet.

In addition, by making the transparent window openable, the aeration tube can be rearranged while the filtration membrane cassette is in the filtration bath and the filtrate discharging pipe can be directly controlled to be well connected to the filtrate outlet when the filtration membrane cassette is inserted into the filtration bath.

Furthermore, after assembled, the submerged-type filtration apparatus of the present invention can be transported to a place where water treatment is required. Thus, the filtration apparatus is suitable for a place where small scale water treatment is required and it facilitates mass production. Since the filtration apparatus can be sold container by container, it has high marketability.

DESCRIPTION OF DRAWINGS

The accompanying drawings, which are included to provide a further understanding of the invention and are incorporated in and constitute a part of this application, illustrate the embodiments of the invention and together with the description serve to explain the principle of the invention. In the drawings.

MODE FOR INVENTION

Hereinafter, submerged-type filtration apparatuses according to the embodiments of the present invention will be described in detail with reference to the annexed drawings.

Figure 1:
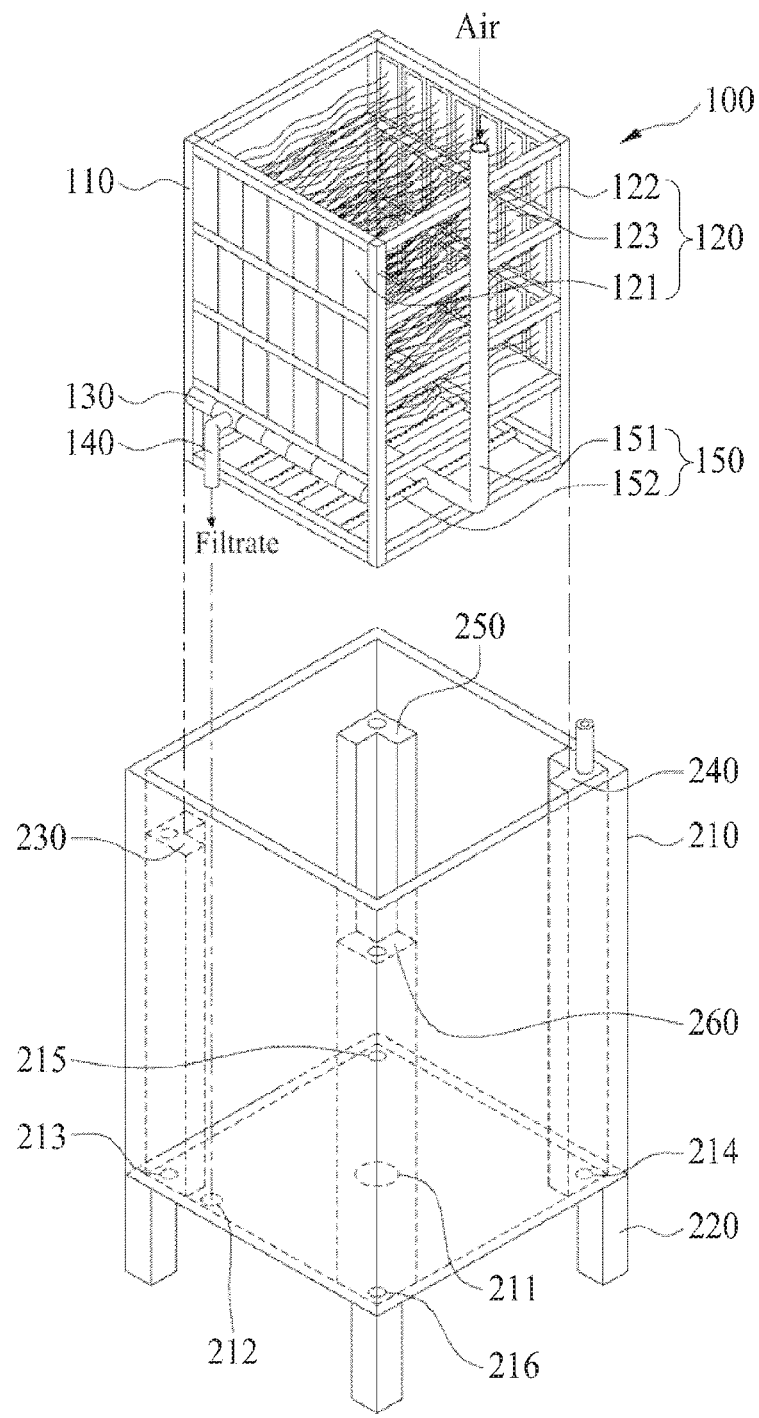
FIG. 1 is a perspective view of a submerged-type filtration apparatus according to one embodiment of the present invention.

As illustrated in FIG. 1, a submerged-type filtration apparatus according to one embodiment of the present invention comprises a filtration bath 210 into which feed water to be processed will be introduced, the filtration bath disposed over the ground, and a filtration membrane cassette 100 configured to be installed in the filtration bath. The filtration membrane cassette 100 may be inserted into or withdrawn from the filtration bath 210.

The filtration membrane cassette 100 comprises a frame structure 110, a plurality of filtering membrane modules 120 installed side by side in the frame structure 110, a water collecting pipe 130 where the filtrate produced by the filtering membrane modules 120 is gathered, a filtrate discharging pipe 140 which is in fluid communication with the water collecting pipe 130, and an aeration unit 150 configured to eject air bubbles toward the filtering membrane modules 120 to prevent the contamination of the filtering membrane modules 120.

According to one embodiment of the present invention, the filtering membrane module 120 is a horizontal-type hollow fiber membrane module 120. That is, the filtering membrane module 120 comprises first and second headers 121 and 122 and a bundle of hollow fiber membranes 123 therebetween, wherein the filtering membrane modules 120 is arranged in the filtration bath 210 in such a way that the longitudinal direction of the hollow fiber membranes 123 is substantially parallel with the surface of the feed water to be processed in the filtration bath and the longitudinal direction of the first and second headers 121 and 122 are substantially perpendicular to the surface.

Each of the first and second headers 121 and 122 has a water collecting space therein where the filtrate penetrating the hollow fiber membranes 123 is gathered and an outlet port on the lower part thereof through which the filtrate is discharged. The outlet ports of the module positioned relatively high are inserted into the headers of the module positioned relatively low so that the filtering membrane modules 120 arranged side by side in vertical direction can be in fluid communication with each other.

The outlet ports on the lower parts of the headers 121 and 122 of the filtering membrane modules 120 disposed at the lowest position are connected to the water collecting pipe 130. Thus, all the filtrate produced by the filtering membrane modules 120 flows into the water collecting pipe 130. The water collecting pipe 130 may be a combination of plural unit pipes and each of the unit pipes may be combined to one of the outlet ports.

As illustrated in FIG. 1, the filtrate discharging pipe 140 is in fluid communication with the water collecting pipe 130. That is, the filtrate produced by the filtering membrane modules 120 is gathered in the water collecting pipe 130, and then discharged to outside through the filtrate discharging pipe 140 which is disposed below the filtering membrane modules 120.

According to the filtration membrane cassette 100 of such structure, since the water pressure of the feed water filling the filtration bath 210 can be used in its entirety for the filtration process (i.e., the negative pressure required for filtration can be lowered as much as the water pressure), the energy reduction effect can be achieved.

Although the filtering membrane module 120 of the present invention is described above by using a horizontal-type hollow fiber membrane module as an example, the filtering membrane module 120 of the present invention is not limited thereto and may also be a vertical-type hollow fiber membrane module or flat sheet membrane module. For example, if the filtering membrane modules 120 are vertical-type hollow fiber membrane modules, the water pressure of the feed water in the filtration bath 210 can be used in its entirety for the filtration process by making the filtrate penetrating the hollow fiber membranes flow not toward the upper header but toward the lower header.

The aeration unit 150 comprises a central air pipe 151 and a plurality of aeration tubes 152 which are the branches of the central air pipe 151. The aeration tubes 152 are arranged below the filtering membrane modules 120. The air from the central air pipe 151 is ejected toward the filtering membrane modules 120 via the aeration tubes 152.

The filtration bath 210 is supported by the supporting members 220 so that it is positioned over the ground.

The filtration bath 210 has an opening through which the filtration membrane cassette 100 is inserted into or withdrawn from the filtration bath 210 for the installation and maintenance of the filtration membrane cassette. In light of the beauty and safety, the filtration bath 210 may further include a lid (not shown) to cover the opening.

The filtration bath 210 has a lower part having tapered shape and a sludge outlet 211 is formed on the lower part so that the condensed water occurring as the filtration process is carried out can be efficiently discharged. Since the filtration bath 210 is supported by the supporting members 220, the sludge outlet 211 is positioned over the ground.

Since the filtration bath 210 is disposed over the ground, the filtering apparatus can be maintained more safely and more conveniently. In addition, the submerged-type filtration apparatus of the present invention has excellent drain efficiency in that the condensed water and/or sludge accumulating in the filtration bath 210 can be naturally discharged through the sludge outlet 211 by virtue of the gravity.

A filtrate outlet 212 is formed on the lower part, e.g., the bottom, of the filtration bath 210.

Although the filtration apparatus of the present invention is submerged-type, it can be installed as easily as a pressurized-type filtration apparatus since the only thing required to do for the installation is to connect the sludge outlet 211, filtrate outlet 212, etc. of the filtration bath 210 with the pipes (not shown).

As illustrated in FIG. 1, the filtration bath 210 of the present invention comprises a first guide disposed therein. The first guide extends in a direction parallel to a direction in which the filtration membrane cassette 100 is inserted into the filtration bath 210. When the filtration membrane cassette 100 is inserted into the filtration bath 210 so as to be installed therein, it is guided by the first guide so that the filtrate discharging pipe 140 of the filtration membrane cassette 100 can be easily connected to the filtrate outlet 212 in fluid communicating manner.

According to one embodiment of the present invention, the first guide is an inner feed water pipe 230 for supplying the feed water to be processed into the filtration bath 210.

The submerged-type filtration apparatus of the present invention may further comprise a second guide disposed in the filtration bath 210 and configured to guide the filtration membrane cassette 100 when the filtration membrane cassette 100 is inserted into the filtration bath 210 so as to be installed therein. The second guide may be an inner air pipe 240 for supplying the aeration unit 150 (more specifically, the central air pipe 151) of the filtration membrane cassette 100 with air.

As illustrated in FIG. 1, the inner feed water pipe 230 and inner air pipe 240 are respectively disposed at the inside corners of the filtration bath 210 of rectangular shape, the inside corners facing each other in the diagonal direction, so that they can perform their function as the first and second guides.

Figure 2:
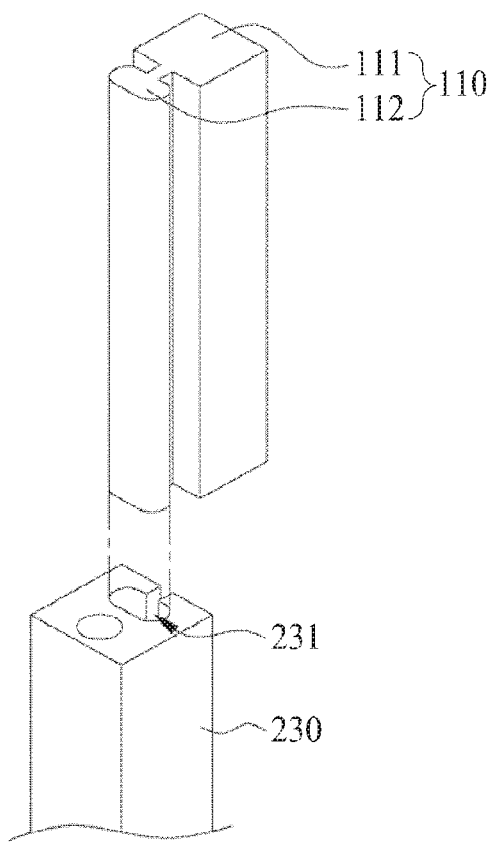
FIG. 2 illustrates a structure of a guide according to one embodiment of the present invention for insertion/withdrawal of a filtration membrane cassette.

Optionally, the filtration bath 210 may further be provided with the third and fourth guides therein for guide the filtration membrane cassette 100 when it is inserted into the filtration bath 210 to be installed therein. For example, the third and fourth guides may be an overflow pipe 250 and a chemical pipe 260. In this instance, as illustrated in FIG. 2, the inner feed water pipe 230, inner air pipe 240, overflow pipe 250, and chemical pipe 260 may be disposed at the four (4) inside corners of the filtration bath 210 of rectangular shape, respectively.

A feed water inlet 213, an air inlet 214, an overflow outlet 215, and chemical inlet 216 are formed at the corners of the bottom of the filtration bath 210, respectively. The feed water is supplied to the inner feed water pipe 230 via the feed water inlet 213, the air is supplied to the inner air pipe 240 via the air inlet 214, the feed water introduced into the overflow pipe 250 to keep the water level of the feed water in the filtration bath 210 in a certain level is discharged from the filtration bath via the overflow outlet 215, and the chemical material for cleaning the filtering membrane 123 is supplied to the chemical pipe 260 via the chemical inlet 216.

According to the present invention, the filtrate outlet 212, air inlet 214, chemical inlet 216, etc. are formed on the bottom of the filtration bath 210 such that a pump (not shown) for supplying negative pressure to the filtering membrane modules 120 via the filtrate outlet 212, a blower (not shown) for supplying air to the aeration unit 150 via the inner air pipe 240, a chemical storage unit (not shown) for supplying the chemical material into the filtration bath 210 through the chemical pipe 260, and so on can be disposed below the filtration bath 210, thereby facilitating a compact submerged-type filtration apparatus of minimum footprint.

Alternatively, as a means for guiding the filtration membrane cassette 100 when it is inserted into the filtration bath 210 so as to be installed therein, only the first guide may be provided in the filtration bath 210. In this instance, either the inner feed water pipe 230 or the inner air pipe 240 may function as the first guide.

For instance, if the inner feed water pipe 230 alone guides the filtration membrane cassette 100, the submerged-type filtration apparatus may have the structure illustrated in FIG. 2 so as to prevent the filtration membrane cassette 100 from deviating from the inner feed water pipe 230 when it is inserted into or withdrawn from the filtration bath 210. That is, as illustrated in FIG. 2, the frame structure 110 of the filtration membrane cassette 100 comprises a main body 111 and a wing 112 formed on the main body 111, and the inner feed water pipe 230 has a groove 231 into which the wing 112 of the frame structure 110 is supposed to be inserted. Both the wing 112 and groove 231 extend in the same direction as the filtration membrane cassette's insertion or withdrawal direction.

Figure 3:
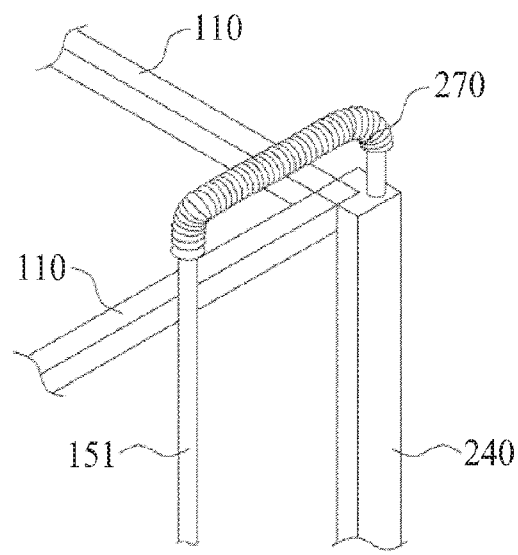
FIG. 3 illustrates a means according to one embodiment of the present invention for connecting an inner air pipe to an aeration unit.

As illustrate in FIG. 3, the submerged-type filtration apparatus according to one embodiment of the present invention may further comprise a flexible hose 270 connecting the inner air pipe 240 and aeration unit 150 (more specifically, the central air pipe 151) to each other. Once the insertion of the filtration membrane cassette 100 into the filtration bath 210 is completed, the inner air pipe 240 and central air pipe 151 are connected to each other in fluid communicating manner by means of the flexible hose 270.

The air supplied from a blower (not shown) disposed below the filtration bath 210 is provided to the aeration tubes 152 only after passing through the inner air pipe 240, flexible hose 270, and central air pipe 151 sequentially so that any damage of the blower that otherwise might be caused due to the feed water flowing backward can be prevented. In other words, in case the blower provides air directly to the aeration tubes 152 via the air inlet 214, the water pressure of the feed water could force the feed water to flow backward since the entire pathway of the air exist only at the lower part of the filtration bath 210. In order to prevent the feed water from flowing backward, according to the filtration apparatus of the present invention, the air supplied from the blower passes through the inner air pipe 240, flexible hose 270, and central air pipe 151 sequentially so that at least a portion of the pathway of the air exists at the upper part of the filtration bath 210, thereby minimizing the water pressure applied to the air pathway.

Figure 4:
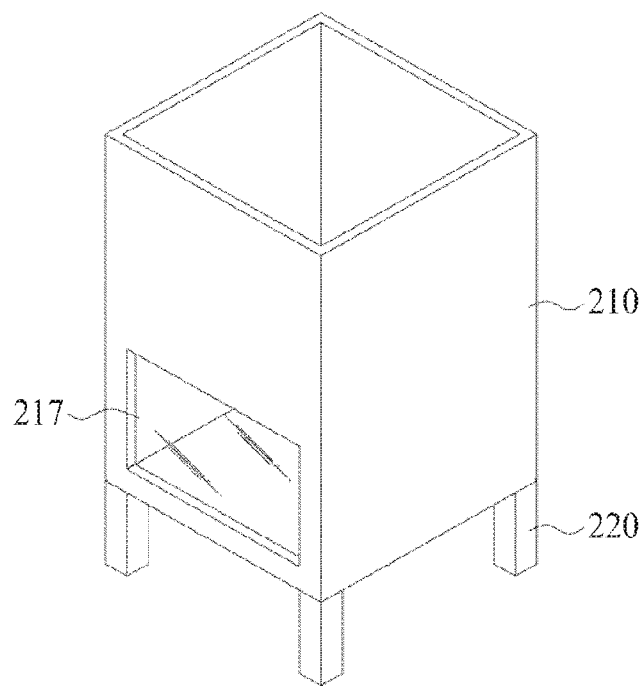
FIG. 4 is a perspective view of a filtration bath according to one embodiment of the present invention.

Optionally, as illustrated in FIG. 4, the filtration bath 210 of the present invention may have a transparent window 217 at the lower part thereof. The air bubbles ejected from the aeration tubes 152 can be observed through the transparent window 217 by a person outside the filtration bath 210 during the filtration process or aeration cleaning process. Therefore, when the air bubbles ejected from aeration tubes 152 are driven to a certain side thereby making it impossible to clean the whole filtering membrane modules 120 uniformly, this accident can be immediately recognized and fixed.

Furthermore, when the filtration membrane cassette 100 is inserted into the filtration bath 210, the connection status between the filtrate discharging pipe 140 and the filtrate outlet 212 can be observed by a person outside the filtration bath 210.

The transparent window 217 may be openable so that the aeration tubes 152 can be rearranged while the filtration membrane cassette is in the filtration bath 210 and the filtrate discharging pipe 140 can be directly controlled for the well connection with the filtrate outlet 212 when the filtration membrane cassette 100 is inserted into the filtration bath 210. The openable transparent window allows the filtration apparatus to be installed and maintained easily.

Figure 5:
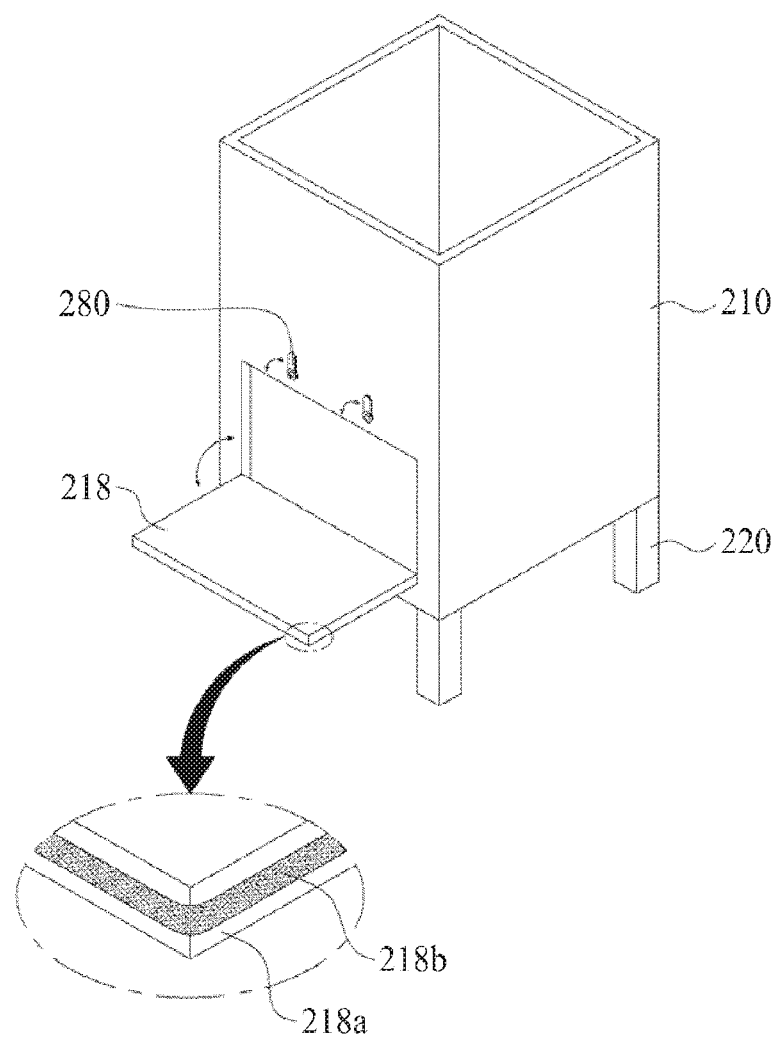
FIG. 5 is a perspective view of a filtration bath according to another embodiment of the present invention.

For example, as illustrated in FIG. 5, the filtration bath 210 may have a hinged window 218. In order to have watertight property high enough to endure the water pressure of the feed water in the filtration bath 210, the hinged window 218 may comprise a transparent member 218a (e.g., transparent glass, transparent plastic, etc.) and a sealing member 218b. In addition, the filtration bath 210 may be provided with a locking member 280 to keep the hinged window 218 closed. Alternatively, the openable transparent window may be a sliding window.

Figure 6:
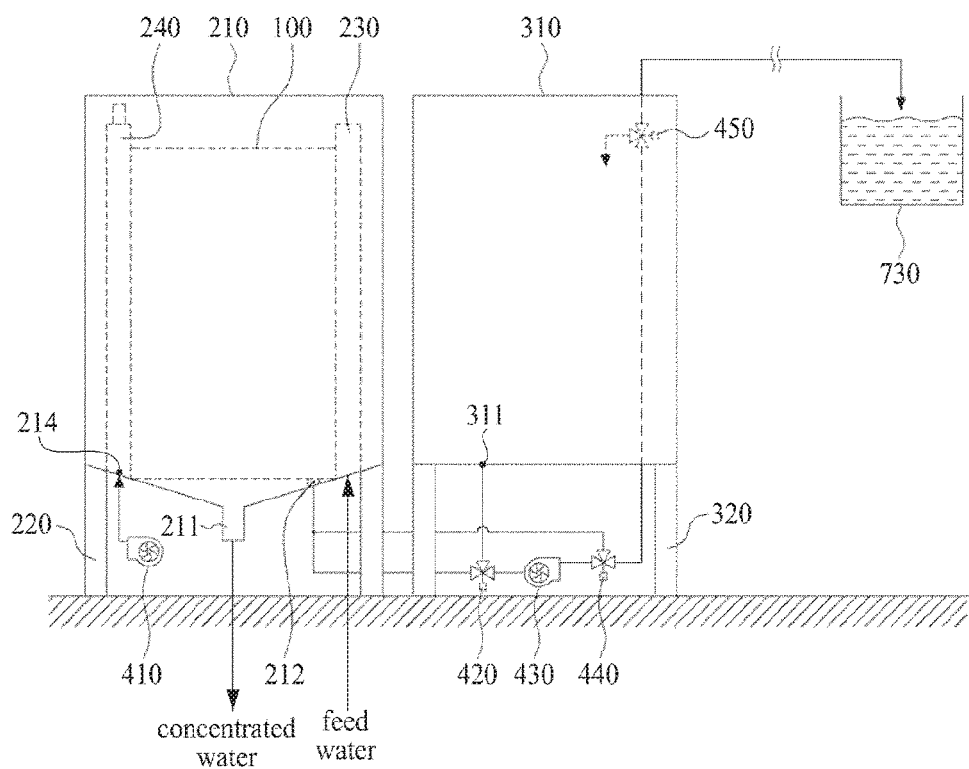
FIG. 6 schematically shows a submerged-type filtration apparatus according to one embodiment of the present invention.

FIG. 6 schematically shows a submerged-type filtration apparatus according to one embodiment of the present invention.

As illustrated in FIG. 6, in addition to the filtration bath 210, the submerged-type filtration apparatus of the present invention may further comprise a backwash water bath 310 disposed adjacent to the filtration bath 210. The backwash water bath 310 is supported by the supporting members 320 so that it is also positioned over the ground. The filtrate discharged from the filtration bath 210 after passing through the filtrate discharging pipe 140 of the filtration membrane cassette 100 and the filtrate outlet 212 of the filtration bath 210 sequentially is introduced into the backwash water bath 310.

The filtration bath 210 and backwash water bath 310 may be spaced apart from each other as illustrated in FIG. 6, or they may share a common partition therebetween.

The filtration apparatus further comprises a pump 430 for providing the filtration membrane cassette 100 or the backwash water bath 310 with negative pressure, a first 3-way valve 420 configured to allow the negative pressure to be supplied only to the filtration membrane cassette 100 during the filtration process and only to the backwash water bath 310 during the backwashing process, and a second 3-way valve 440 configured to allow the filtrate provided from the filtration membrane cassette 100 by virtue of the pump 430 to flow only to the backwash water bath 310 during the filtration process and allow backwash water provided from the backwash water bath 310 by virtue of the pump 430 to flow only to the filtration membrane cassette 100 during the backwashing process.

According to the filtration apparatus of such structure, the component cost can be reduced since both the power for filtration process and the power for backwashing process can be obtained from a single pump 430, and a substantial amount of energy can be saved since the pump works pauselessly for both filtration and backwashing processes which are alternately carried out.

The submerged-type filtration apparatus may further comprise a filtrate storage tank 730. A pipe for guiding the flow of the filtrate from the filtrate outlet 212 of the filtration bath 210 to the filtrate storage tank 730 passes through the backwash water bath 310.

The submerged-type filtration apparatus further comprises a float valve 450 mounted on a part of the pipe passing through the backwash water bath 310. The float valve 450 is configured to allow the filtrate discharged from the filtration bath 210 to be supplied to the backwash water bath 310 and, once the water level of the filtrate in the backwash water bath 310 reaches a predetermined level, allow the filtrate discharged from the filtration bath 210 to pass the backwash water bath 310 and then flow into the filtrate storage tank 730.

As illustrated in FIG. 6, together with the blower 410 for supplying air to the inner air pipe 240 via the air inlet 214 of the filtration bath 210, all the pump 430, first and second 3-way valves 420 and 440, and various pipes are disposed below the filtration bath 210 and backwash water bath 310, thereby facilitating a compact submerged-type filtration apparatus of minimum footprint.

Hereinafter, referring to FIG. 7 to FIG. 9, a submerged-type filtration apparatus according to another embodiment of the present invention will be described in more detail.

Figure 7:
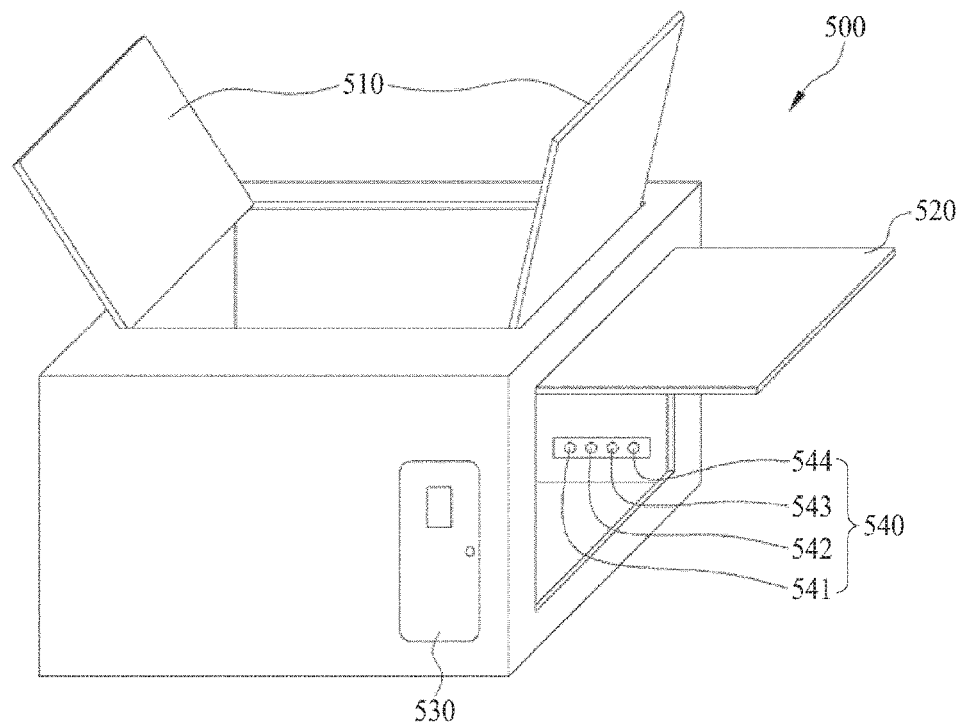
FIG. 7 is a perspective view of a container of a submerged-type filtration apparatus according to another embodiment of the present invention.
Figure 8:
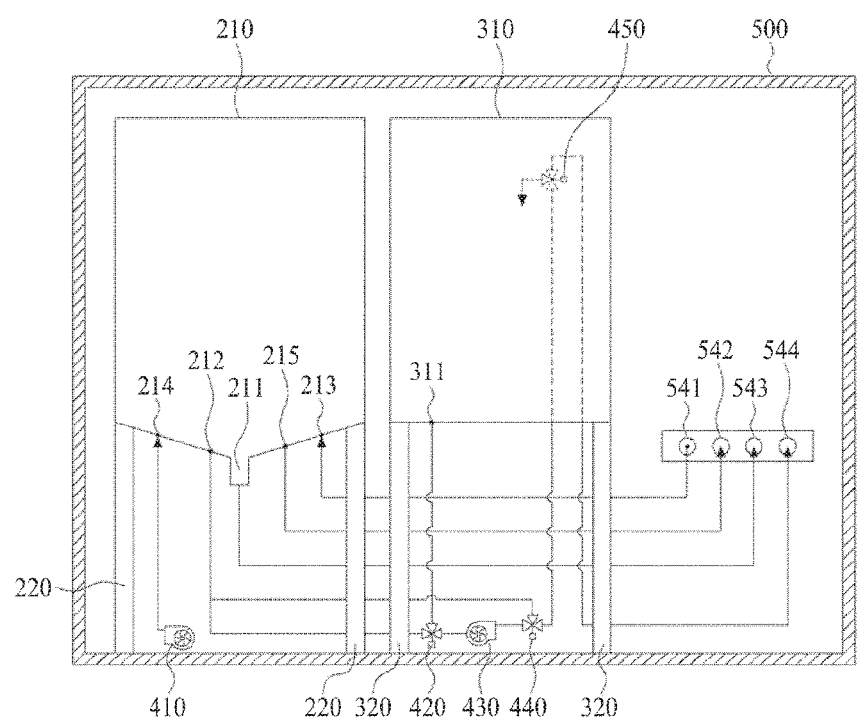
FIG. 8 schematically shows a submerged-type filtration apparatus according to another embodiment of the present invention.

The submerged-type filtration apparatus according to another embodiment of the present invention comprises a container 500 as illustrated in FIG. 7.

The container 500 of rectangular shape comprises an openable upper door 510, an openable side door 520, an openable front door 530, and a connecting unit 540 for connecting the filtration apparatus of the present invention to the external components.

When the various components of the filtration apparatus of the present invention are installed inside the container 500, the side door 520 can provide a pathway for the introduction of the components.

When the filtration membrane cassette (not shown) is withdrawn from the container 500 for maintenance, the upper door 510 can provide a pathway for the withdrawal of the filtration membrane cassette.

The front door 530 can provide a pathway for an operator to come in and out the container 500 to operate the filtration apparatus of the present invention and maintain the various components.

The connecting unit 540 is for connecting the components inside the container 500 to other external components (e.g., a feed water source, a sludge storage tank, a filtrate storage tank, etc.). For instance, the connecting unit 540 may comprises a feed water inlet port 541, an overflow outlet port 542, a sludge outlet port 543, and a filtrate outlet port 544.

Although the filtration apparatus of the present invention is submerged-type, it can be installed as easily as a pressurized-type filtration apparatus since the only thing that is needed to do for the installation of the filtration apparatus is to connect the feed water inlet port 541, overflow outlet port 542, sludge outlet port 543, and filtrate outlet port 544 to the feed water source, sludge storage tank, filtrate storage tank, and filtrate storage tank, respectively.

The filtration bath 210 and backwash water bath 310 are positioned inside the container 500. The filtration membrane cassette 100 has been installed in the filtration bath 210 as described above.

Hereinafter, referring to FIG. 8 and FIG. 9, a submerged-type filtration apparatus according to an embodiment of the present invention and the operation thereof will be described in more detail. FIG. 8 schematically shows a submerged-type filtration apparatus according to another embodiment of the present invention, and FIG. 9 is a block diagram illustrating a submerged-type filtration apparatus according to another embodiment of the present invention.

The feed water inlet 213 formed on the bottom of the filtration bath 210 and the feed water inlet port 541 of the container 500 are connected to each other via a pipe so that the feed water to be processed can pass through the feed water inlet port 541 and feed water inlet 213 sequentially, thereby entering the filtration bath 210.

The filtrate produced by the filtration membrane cassette 100 passes through the filtrate outlet 212 formed on the bottom of the filtration bath 210 and the filtrate outlet port 544 of the container 500 sequentially, thereby being discharged from the container 500.

The overflow outlet 215 formed on the bottom of the filtration bath 210 and the overflow outlet port 542 of the container 500 are connected to each other via a pipe so that the overflow occurring when the water level of the feed water in the filtration bath 210 becomes a predetermined level or more can pass through the overflow outlet 215 and overflow outlet port 542 sequentially, thereby being discharged from the container 500.

The sludge outlet 211 formed on the bottom of the filtration bath 210 and the sludge outlet port 543 of the container 500 are connected to each other via a pipe so that the condensed water and sludge accumulating in the filtration bath 210 as the filtration process is carried out can pass through the sludge outlet 211 and sludge outlet port 543, thereby being discharged from the container 500.

Figure 9:
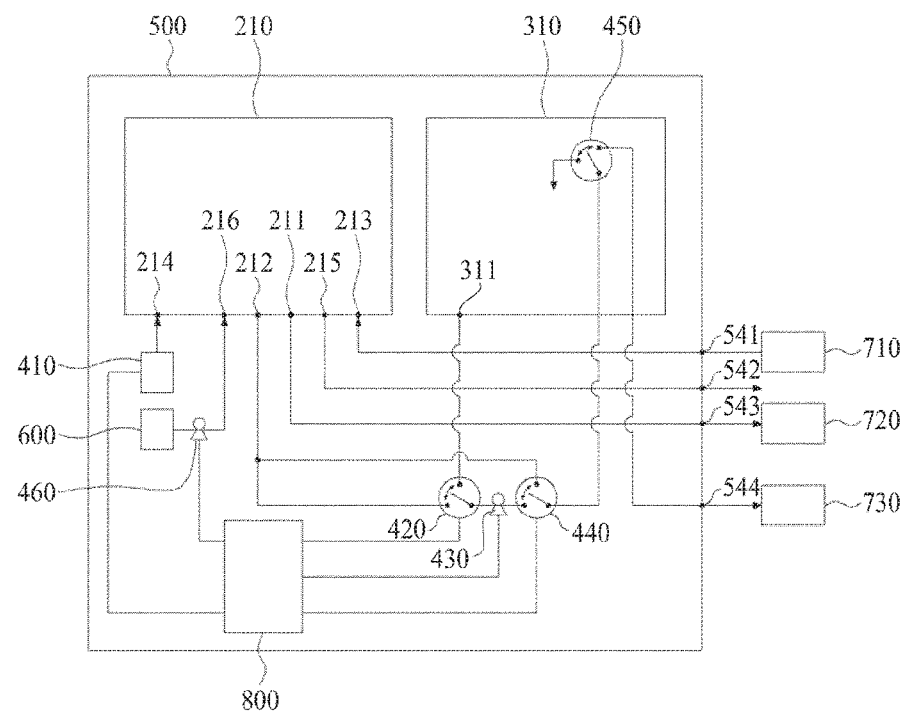
FIG. 9 is a block diagram illustrating a submerged-type filtration apparatus according to another embodiment of the present invention.

As illustrated in FIG. 9, after the container 400 of the present invention having a variety of components including the filtration bath 210, backwash water bath 310, etc. therein is transported to a place where water treatment is required, the feed water inlet port 541, sludge outlet port 543, and filtrate outlet port 544 are respectively connected to the feed water source 710, sludge storage tank 720, and the filtrate storage tank 730 provided in the place. The overflow outlet port 542 of the container 500 may be connected to the feed water source 710 or to an overflow storage tank (not shown) separately provided in the place.

As described above, the submerged-type filtration apparatus of the present invention further comprises a backwash water bath 310 disposed near the filtration bath 210 in the container 500. The filtration bath 210 and backwash water bath 310 may be spaced apart from each other as illustrated in FIG. 8, or they may share a common partition therebetween.

The backwash water bath 310 is supported by the supporting members 320 so that it is also positioned over the ground. The filtrate produced by the filtration membrane cassette 100 and discharged from the filtration bath 210 via the filtrate outlet 212 is introduced into the backwash water bath 310, and at least a portion thereof is stored in the backwash water bath 310.

A pipe for guiding the filtrate discharged from the filtration bath 210 via the filtrate outlet 212 during the filtration process to the filtrate outlet port 544 of the container 500 passes through the backwash water bath 310. The submerged-type filtration apparatus further comprises a float valve 450 mounted on a part of the pipe passing through the backwash water bath 310. The float valve 450 is configured to allow the filtrate discharged from the filtration bath 210 to be supplied to the backwash water bath 310 via the pipe and, once the water level of the filtrate in the backwash water bath 310 reaches a predetermined level, allow the filtrate discharged from the filtration bath 210 to pass the backwash water bath 310 and flow toward the filtrate outlet port 544.

A backwash water outlet 311 is formed on the bottom of the backwash water bath 310.

The container 500 is provided therein with a first pump 430 for providing the filtration membrane cassette 100 with negative pressure through the filtrate outlet 212 or providing the backwash water bath 310 with negative pressure through the backwash water outlet 311, a first 3-way valve 420 configured to allow the negative pressure provided by the first pump to be supplied only to the filtration membrane cassette 100 during the filtration process and only to the backwash water bath 310 during the backwashing process, and a second 3-way valve 440 configured to allow the filtrate produced by the filtration membrane cassette 100 to flow only to the backwash water bath 310 during the filtration process and allow the filtrate provided from the backwash water bath 310 to flow only to the filtration membrane cassette 100 during the backwashing process.

According to the aforementioned structure, the component cost can be reduced since both the power for filtration process and the power for backwashing process can be obtained from a single pump, i.e., the first pump 430. Furthermore, since the first pump 430 works pauselessly for both filtration and backwashing processes which are alternately carried out, a substantial amount of energy can be saved and the life of the first pump 430 can be prevented from being shortened.

A blower 410 is disposed below the filtration bath 210 in the container 500. The blower 410 supplies the air to the inner air pipe 240 via the air inlet 214 formed on the bottom of the filtration bath 210. The air supplied to the inner air pipe 240 passes through the flexible hose 270, central air pipe 151, and aeration tubes 152 sequentially, and is ejected toward the filtering membrane modules 120.

As illustrated in FIG. 9, the submerged-type filtration apparatus of the present invention may further comprise a chemical storage unit (600) disposed in the container 500 and a second pump 460 for supplying the chemical material contained in the chemical storage unit 600 to the filtration bath 210 via the chemical inlet 216 of the filtration bath 210.

The submerged-type filtration apparatus of the present invention may further comprise a control unit 800 disposed in the container 500. The control unit 800 may control the operation of the first pump 430, the first and second 3-way valves 420 and 440, the blower 410, and the second pump 460 based on an input program.

Hereinafter, the operation of the aforementioned submerged-type filtration apparatus will be described in detail.

First, the feed water to be processed, which is supplied from the feed water source 710, is introduced into the filtration bath 210 via the feed water inlet port 541 of the container 500 and the feed water inlet 213 of the filtration bath 210.

Once the water level of the feed water in the filtration bath 210 becomes a predetermined level or more, the feed water enters the overflow pipe 250 and passes through the overflow outlet 215 of the filtration bath 210 and the overflow outlet port of the container 500 sequentially, thereby being discharged from the container 500.

The first pump 430 is controlled by the control unit 800 to continuously supply the negative pressure during both filtration and backwashing processes.

During the filtration process, the first 3-way valve 420 is controlled by the control unit 800 to allow the negative pressure provided by the first pump 430 to be supplied to the filtration membrane cassette 100 via the filtrate outlet 212 of the filtration bath 210. The filtration membrane cassette 100 provided with the negative pressure from the first pump 430 produces the filtrate. The second 3-way valve 440 is controlled by the control unit 800 to allow the filtrate produced by the filtration membrane cassette 100 to be supplied to the backwash water bath 310. When the water level of the filtrate in the backwash water bath 310 reaches a certain level or more, the float valve 450 is triggered such that the filtrate from the filtration membrane cassette 100 passes the backwash water bath 310, comes out of the container 500 through the filtrate outlet port 544, and enters the filtrate storage tank 730.

In order to carry out the aeration cleaning over the filtering membrane modules 120 during the filtration process, the blower 410 is controlled by the control unit 800 to supply the air to the inner air pipe 240 in the filtration bath 210 via the air inlet 214 formed on the bottom of the filtration bath 210. The air supplied to the inner air pipe 240 passes through the flexible hose 270, the central air pipe 151, and the aeration tubes 152 sequentially, and is ejected toward the filtering membrane modules 120.

The backwashing process is performed while the filtration process is stopped. During the backwashing process, the first 3-way valve 420 is controlled by the control unit 800 to allow the negative pressure provided by the first pump 430 to be supplied to the backwash water bath 310 via the backwash water outlet 311. Once the negative pressure from the first pump 430 is supplied to the backwash water bath 310, the filtrate therein is discharged via the backwash water outlet 311. The second 3-way valve 440 is controlled by the control unit 800 to allow the filtrate discharged from the backwash water bath 310 to be supplied to the filtration membrane cassette 100 via the filtrate outlet 212 of the filtration bath 210. As the filtrate supplied to the filtration membrane cassette 100 penetrates the filtering membrane 123 from inside to outside, the contaminants attached to the outer surface of the filtering membrane 123 are removed.

During the backwashing process, the second pump 460 is controlled by the control unit 800 to in such a manner that the chemical material in the chemical storage unit 600 can be supplied to the filtration bath 210 via the chemical inlet 216 thereof.

The condensed water and/or sludge occurring in the filtration bath 210 during the filtration process is discharged from the container 500 via the sludge outlet 211 of the filtration bath 210 and the sludge outlet port 543 of the container 500, and then stored in the external sludge storage tank 720.

According to the present invention, the only thing to do is just to transport the container to a place where water treatment is required and then connect the container to the tanks by means of pipes. Thus, the filtration apparatus is suitable for a place where small scale water treatment is required and it facilitates mass production. Since the filtration apparatus can be sold container by container, it has high marketability.

The invention claimed is:

1. A submerged-type filtration apparatus comprising: a filtration bath disposed over a ground; a filtration membrane cassette configured to be installed in the filtration bath, the filtration membrane cassette comprising a frame structure and a plurality of filtering membrane modules installed in the frame structure; a first guide disposed in the filtration bath and configured to guide the filtration membrane cassette when the filtration membrane cassette is inserted into the filtration bath so as to be installed in the filtration bath, wherein the first guide is an inner feed water pipe through which a feed water to be treated, introduced from outside of the submerged-type filtration apparatus, is supplied into the filtration bath; and a second guide disposed in the filtration bath and configured to guide the filtration membrane cassette when the filtration membrane cassette is inserted into the filtration bath so as to be installed in the filtration bath, wherein the filtration membrane cassette further comprises an aeration unit combined with the frame structure and configured to eject air bubbles toward the filtering membrane modules, and wherein the second guide is an inner air pipe for supplying air to the aeration unit.

2. The submerged-type filtration apparatus of claim 1, wherein the first guide extends in a direction parallel to a direction in which the filtration membrane cassette is inserted into the filtration bath.

3. The submerged-type filtration apparatus of claim 1, further comprising a blower configured to supply air to the inner air pipe through an air inlet formed on a lower part of the filtration bath.

4. The submerged-type filtration apparatus of claim 3, further comprising a flexible hose connecting the inner air pipe to the aeration unit.

5. The submerged-type filtration apparatus of claim 1, wherein
the filtration bath has a filtrate outlet on a lower part thereof;
the filtration membrane cassette further comprises
a water collecting pipe where a filtrate produced by the filtering membrane modules is gathered; and
a filtrate discharging pipe being in fluid communication with the water collecting pipe; and
the filtrate discharging pipe is connected to the filtrate outlet in fluid communicating manner so that the filtrate can be discharged out of the filtration bath through the filtrate outlet.

6. The submerged-type filtration apparatus of claim 5, further comprising a backwash water bath configured to receive the filtrate discharged through the filtrate outlet.

7. The submerged-type filtration apparatus of claim 6, further comprising:
a filtrate storage tank; and
a float valve configured to allow the filtrate discharged from the filtration bath to pass the backwash water bath and flow into the filtrate storage tank once water level of the filtrate in the backwash water bath reaches a predetermined level.

8. The submerged-type filtration apparatus of claim 7, further comprising a pipe for guiding flow of the filtrate from the filtrate outlet to the filtrate storage tank,
wherein the pipe passes through the backwash water bath.

9. The submerged-type filtration apparatus of claim 6, further comprising:
a pump for providing the filtration membrane cassette or the backwash water bath with negative pressure;
a first 3-way valve configured to allow the negative pressure to be supplied only to the filtration membrane cassette during a filtration process and only to the backwash water bath during a backwashing process; and
a second 3-way valve configured to allow the filtrate provided from the filtration membrane cassette by virtue of the pump to flow only to the backwash water bath during the filtration process and allow backwash water provided from the backwash water bath by virtue of the pump to flow only to the filtration membrane cassette during the backwashing process.

10. The submerged-type filtration apparatus of claim 1, wherein the filtration bath includes a transparent window.

11. The submerged-type filtration apparatus of claim 10, wherein the transparent window is openable.

12. The submerged-type filtration apparatus of claim 1, further comprising a container having the filtration bath therein,
wherein the filtration bath has a feed water inlet and a filtrate outlet, the feed water inlet being connected to the inner feed water pipe,
the container has a feed water inlet port and a filtrate outlet port,
the feed water to be processed passes through the feed water inlet port of the container, the feed water inlet of the filtration bath, and the inner feed water pipe sequentially so as to be introduced into the filtration bath, and
filtrate produced by the filtration membrane cassette passes through the filtrate outlet and the filtrate outlet port sequentially so as to be discharged from the container.

13. The submerged-type filtration apparatus of claim 12, further comprising a backwash water bath disposed in the container and configured to receive at least a portion of the filtrate produced by the filtration membrane cassette and discharged from the filtration bath through the filtrate outlet.

14. The submerged-type filtration apparatus of claim 13, further comprising a float valve in the backwash water bath, the float valve configured to allow the filtrate discharged from the filtration bath through the filtrate outlet to pass the backwash water bath without stopping and flow only to the filtrate outlet port once water level of the filtrate in the backwash water bath reaches a predetermined level.

15. The submerged-type filtration apparatus of claim 14, wherein the backwash water bath has a backwash water outlet, the filtration membrane cassette comprises an aeration unit for cleaning a filtering membrane,
the filtration bath has an air inlet,
the submerged-type filtration apparatus further comprises:
a first pump for providing the filtration membrane cassette with negative pressure through the filtrate outlet or providing the backwash water bath with negative pressure through the backwash water outlet;
a first 3-way valve configured to allow the negative pressure from the first pump to be supplied only to the filtration membrane cassette during a filtration process and only to the backwash water bath during a backwashing process;
a second 3-way valve configured to allow the filtrate produced by the filtration membrane cassette to flow only to the backwash water bath during the filtration process and allow the filtrate provided from the backwash water bath to flow only to the filtration membrane cassette during the backwashing process;
a blower configured to supply air to the aeration unit through the air inlet; and
a control unit configured to control operation of the first pump, the first and second 3-way valves, and the blower, and
the first pump, the first and second 3-way valves, the blower, and the control unit are disposed in the container.

16. The submerged-type filtration apparatus of claim 15, wherein the filtration bath further has a chemical inlet,
the submerged-type filtration apparatus further comprises, in the container:
a chemical storage unit; and
a second pump for supplying a chemical material contained in the chemical storage unit to the filtration bath via the chemical inlet, and
operation of the second pump is controlled by the control unit.

17. The submerged-type filtration apparatus of claim 12, wherein the filtration bath further has an overflow outlet and the container further has an overflow outlet port, so that an overflow which occurs when water level of the feed water in the filtration bath becomes a predetermined level or more can pass through the overflow outlet and the overflow outlet port sequentially so as to be discharged from the container.

18. The submerged-type filtration apparatus of claim 12, wherein the filtration bath further has a sludge outlet and the container further has a sludge outlet port, so that condensed water and sludge which accumulate in the filtration bath as a filtration process is carried out can pass through the sludge outlet and the sludge outlet port sequentially so as to be discharged from the container.

* * * * *